(12) United States Patent
Freedman

(10) Patent No.: US 10,295,198 B1
(45) Date of Patent: May 21, 2019

(54) TWO-SECTION WOODEN ENCLOSURE FOR A HYDRONIC BASEBOARD FINNED TUBE HEATER

(71) Applicant: Curt M. Freedman, Longmeadow, MA (US)

(72) Inventor: Curt M. Freedman, Longmeadow, MA (US)

( * ) Notice: Subject to any disclaimer, the term of this patent is extended or adjusted under 35 U.S.C. 154(b) by 316 days.

(21) Appl. No.: 15/079,464

(22) Filed: Mar. 24, 2016

Related U.S. Application Data

(60) Provisional application No. 62/138,182, filed on Mar. 25, 2015.

(51) Int. Cl.
| | | |
|---|---|---|
| F24D 19/02 | (2006.01) | |
| F24H 9/06 | (2006.01) | |
| F24F 3/00 | (2006.01) | |
| F24D 5/10 | (2006.01) | |
| F24D 19/06 | (2006.01) | |
| F24F 7/00 | (2006.01) | |
| F24F 13/08 | (2006.01) | |
| F24F 13/06 | (2006.01) | |
| F24F 6/00 | (2006.01) | |
| F24F 13/10 | (2006.01) | |
| E06C 7/14 | (2006.01) | |
| E04F 19/00 | (2006.01) | |
| E04F 17/04 | (2006.01) | |
| F16M 13/02 | (2006.01) | |
| F28F 1/28 | (2006.01) | |

(52) U.S. Cl.
CPC ............ *F24D 19/064* (2013.01); *E04F 17/04* (2013.01); *E04F 19/00* (2013.01); *F16M 13/02* (2013.01); *F28F 1/28* (2013.01)

(58) Field of Classification Search
CPC .... F24D 19/064; F24D 19/065; F24D 19/067; F24D 19/068; F24D 2220/2072; E04F 19/00; E04F 17/04
USPC ..... 165/49, 50, 53, 55; 248/232, 201, 205.1, 248/213.4, 209; 454/246, 287, 328
See application file for complete search history.

(56) References Cited

U.S. PATENT DOCUMENTS

| | | | | |
|---|---|---|---|---|
| 1,885,537 | A | * 11/1932 | Murray, Jr. ............. | F24D 19/02 165/55 |
| 2,487,287 | A | * 11/1949 | Weber ..................... | F24D 19/04 165/103 |
| 2,501,147 | A | * 3/1950 | Tolan ...................... | F24D 19/04 165/134.1 |
| 2,651,504 | A | * 9/1953 | Gundrum ................ | F24D 19/04 165/103 |

(Continued)

*Primary Examiner* — Paul Alvare
(74) *Attorney, Agent, or Firm* — Malcolm J. Chisholm, Jr.

(57) ABSTRACT

The two-section wooden enclosure (10) has a first section (40) including a top panel (18) secured to a plurality of mounting brackets (42A, 42B), and a second section (60) including a front panel (20) having a first side panel (22) and a second side panel (26) secured to opposed side ends (24, 28) of the front panel (20). The first section (40) is secured to a hydropic finned tube heater (59) and a vertical wall (12). The first and second side panels (22, 26) of the second section (60) are secured to the vertical wall (12) so that the front panel (20) is adjacent and below the top panel (18) to cover the finned tube heater (59). The second section (60) may be removed from the vertical wall (12) without removal of the first section (40) from the vertical wall (12).

9 Claims, 3 Drawing Sheets

(56) References Cited

U.S. PATENT DOCUMENTS

| | | | | |
|---|---|---|---|---|
| 2,662,747 A | * | 12/1953 | Trane | F24D 19/04 165/55 |
| 2,688,417 A | * | 9/1954 | Bowers | H02G 3/125 220/3.9 |
| 2,872,162 A | * | 2/1959 | Marini | F24D 19/04 165/55 |
| 2,934,320 A | * | 4/1960 | Barbeau | F24D 19/04 165/134.1 |
| 3,051,816 A | * | 8/1962 | Knoll | F24H 3/002 165/181 |
| 3,091,289 A | * | 5/1963 | Weinstein | F24D 19/04 165/182 |
| 3,147,484 A | * | 9/1964 | Nelson | B25C 1/02 227/139 |
| 3,566,077 A | * | 2/1971 | Steiner | F24H 3/002 165/55 |
| 5,537,506 A | * | 7/1996 | Fennesz | F24D 13/04 165/55 |
| 6,889,911 B2 | * | 5/2005 | Uglietto | F24D 19/04 165/55 |
| 2006/0237553 A1 | * | 10/2006 | Brown | F24D 19/04 237/70 |

* cited by examiner

TWO-SECTION WOODEN ENCLOSURE FOR A HYDRONIC BASEBOARD FINNED TUBE HEATER

CROSS-REFERENCE TO RELATED APPLICATIONS

This Application claims the benefit of U.S. Provisional Patent Application Serial Number 62/138,182 that was filed on Mar. 25, 2015 entitled "Integral and Customizable Wooden Enclosed Hydronic Baseboard Tube Heating System".

TECHNICAL FIELD

This disclosure relates to enclosures for hydronic (meaning a heated water) baseboard finned tube heaters that extend along a floor adjacent a vertical wall within a building, and in particular relates to a two-section, wooden enclosure for providing an aesthetically enhanced enclosure that also facilitates flow of air through the enclosure for efficient heating of the air while also providing for ease of cleaning and servicing of the enclosure and heating tubes.

BACKGROUND ART

It is well known that hydronic baseboard finned tube heaters typically include a copper tube or pipe that receives heated water or a water-based solution including antifreeze, etc., and heat moves from the water by conduction through the copper and into heat diffusion fins secured to the copper pipe or tube. The fins are frequently made of aluminum and it is not unusual to have five or more two-inch fins per inch of copper pipe. Most often the finned copper tube is supported within a metal enclosure by metal brackets extending from an adjacent vertical wall near the floor of a habitable building, such as a dwelling house, commercial building or similar structure. The metal enclosure also includes a top metal cover and a front metal panel running along and overlying the finned tube heaters.

The front panel and top cover of the enclosure define air inlet slots below the finned tubing and air outlet slots above the tubing to thereby generate a "chimney effect", wherein cool air enters below the finned tubing; is heated by the finned tube heaters; and rises by convection out of the air outlet slots to ascend adjacent the vertical wall. This produces a cycling effect wherein the rising hot air forces cooler air to descend toward the floor and eventually back into the inlet slot of the hydronic finned tube heater enclosure.

It is most common that such hydronic baseboard finned tube heater enclosures are constructed of metal brackets and metal panels because of the lower costs of manufacture with metal compared to use of more durable and more expensive materials. In large apartment buildings and virtually all modern home, construction that utilize heated water or hydronic heating systems, metal brackets and metal enclosures are utilized to minimize costs. It is common that, such metal bracket and enclosures are available in pre-measured incremental sections, such as two-foot, four-foot, or eight-foot sections that may be combined for varying heat demands and floor plan limitations. These metal enclosures for hydronic finned tube heaters are limited in available colors; are often considered to be quite unsightly; and, are susceptible to rust and denting that makes them even more unsightly.

Efforts have been undertaken to improve the aesthetic appearance of such metal enclosures by simply removing the metal front panel and inserting a wooden cover that is dimensioned to shield from view the metal brackets and the finned tube heaters. While these provide a modest improvement, they commonly are so bulky, and available only in predetermined lengths, that they are difficult to install along an entire finned tube heater to achieve a desired effect. Moreover, such wooden covers are frequently more attractive than practical. They are often designed with a plurality of lateral heat diffusion slots that disrupt the favorable "chimney effect" achieved by matched lower inlet and upper outlet air slots, thereby increasing overall heating costs. Exemplary wooden enclosures may be available from a company entitled "RUNTAL NORTH AMERICA, Inc.", as disclosed at a website having a domain name of: runtalnorthamerica.com. However, these have not received widespread acceptance in the marketplace because they are complex, and once installed, very difficult to remove for maintenance and cleaning of the finned tube heaters within the enclosures.

Accordingly, there is a need for an improved hydronic heating system that overcomes the deficiencies of the prior art.

SUMMARY OF THE DISCLOSURE

The disclosure includes a two-section wooden enclosure for a hydronic baseboard finned tube heater, wherein the finned tube heater extends along a floor and adjacent a vertical wall of a building. The two-section enclosure has a first section including a top panel and a plurality of mounting brackets. The top panel is secured to top edges of the brackets, and the mounting brackets are secured to the vertical wall at pre-selected intervals along the wall by fasteners, such as threaded fasteners or common wood screws. The fasteners pass through at least a mid-segment of back edges of the mounting brackets into the wall. Each mounting bracket defines a support slot extending from a front edge of the bracket toward a back edge of the bracket and above a bottom edge of the bracket. The support slot is configured to receive a finless section of the finned tube heater through the front edge of the bracket. The support slot supports the finned tube heater within the slot above the bottom edge of the bracket.

A second section of the enclosure includes a front panel, a first side panel and a second side panel. The front panel has a top edge and an opposed bottom edge. A first side edge of the panel extends between the top and bottom edges of the front panel at a first end of the panel. A second side edge of the panel extends between the top and bottom edges of the front panel at a second end of the panel. The first side panel is secured to the first end of the front panel and the second side panel is secured to the second end of the front panel. The first and second side panels extend in parallel association with each other in a direction perpendicular to a plane defined by the front panel, and they also extend in a direction away from a front surface of the front panel and toward the back edges of the mounting brackets.

The first side panel is secured either directly or indirectly to the vertical wall adjacent a first end of the top panel. The second side panel is also secured either directly or indirectly to the vertical wall adjacent a second end of the top panel opposed to the first end of the top panel. Therefore, the second section of the enclosure may be moved away from the vertical wall without removal of the first section of the enclosure from the vertical wall to facilitate cleaning and servicing of the finned heater tubes within the two-section enclosure.

Securing the first and second side panels directly into the vertical wall means that at least one fastener passes at a non-perpendicular angle through outer surfaces of the first and second side panels directly into the vertical wall. Securing the first and second side panels indirectly into the vertical wall means that first and second end walls are secured into the vertical wall adjacent and under the first and second ends of the top panel and between the top panel and the floor. At least one fastener passes at about a perpendicular angle through outer surfaces of each of the first and second side panels directly into the first and second end walls respectively to thereby secure the first and second side panels indirectly to the vertical wall.

In another aspect of the two-section wooden enclosure, each mounting bracket defines a jig-drilled, stepped screw bore passing from the front edge of the bracket through the top edge of the bracket. A top-panel screw within the stepped screw bore fastens the top panel to the top edge of the bracket. The stepped screw bore includes a step defined within the bore that is configured to abut a driving head of the top-panel screw at a location within the stepped screw bore so that a leading tip of the top-panel screw is prevented from passing through a top surface of the top panel.

In an additional embodiment of the two-section wooden enclosure, each mounting bracket includes baffle slots defined within opposed sides of side surfaces of the mounting bracket. The baffle slots pass from adjacent the mid-segment of the back edge of the mounting bracket and through the top edge of the mounting bracket. A baffle is secured within the baffle slots so that the baffle extends between the mounting brackets to direct heated air passing through the two-section wooden enclosure away from the top panel and out of the enclosure through an air outlet slot defined within the top edge of the wooden front panel. Additionally, the baffle slots may be dimensioned to cross over and outside of opposed sides of the jig-drilled, stepped screw bore.

In an additional embodiment of the two-section wooden enclosure, a mounting backboard is secured to the vertical wall and to the back edges of the mounting brackets. In this embodiment, the backboard may be secured to the vertical wall first, and then the mounting brackets may be secured to the mounting backboard, or the mounting brackets may be first secured to the backboards prior to the backboards being secured to the vertical wall, depending upon specific characteristics of the finned tube heaters being enclosed.

In another aspect of the disclosure, the mounting backboard may be secured to the vertical wall a predetermined distance above a floor of the building. Similarly, the mounting brackets may be secured a predetermined distance above the floor of the building. Also, the bottom edge of the wooden front panel includes an air inlet slot defining an opening that extends a predetermined distance above a floor of the building. This aspect of the disclosure enhances convective flow of air within the building through the finned tube heaters while also facilitating cleaning access between the floor and the bottom edges of the mounting brackets and the mounting backboard.

In a particular embodiment of the two-section wooden enclosure, an air outlet slot defined within the top edge of the wooden front panel has a planer area at least as large as a planar area of the air inlet slot defined within the bottom edge of the wooden front panel. This promotes a beneficial "chimney effect" in flow of air through the two-section enclosure.

In another aspect of the two-section wooden enclosure, an outer surface of the first side panel includes a first magnet attachment mechanism, an outer surface of the second side panel includes a second magnet attachment mechanism. Additionally, an inner surface of a first wooden magnetic cover plate includes a third magnetic attachment mechanism and is detachably and magnetically secured to overlie the first side panel. Also, an inner surface of a second wooden magnetic cover plate includes a fourth magnetic attachment mechanism and is detachably and magnetically secured to overlie the second side panel. Outer surfaces of the magnetic cover plates display an uninterrupted wooden surface, as do outer surfaces of the side panels, top panel and front panel. Therefore, the fasteners securing the side panels directly or indirectly to the vertical wall are concealed by the first and second magnetic cover plates. Additionally, the fasteners securing the mounting brackets to the vertical wall and the top panel screws are both concealed by the front panel. Therefore, all fasteners securing the first and second sections of the two-section wooden enclosure to the vertical wall are concealed from view by an observer within the building. Such an observer therefore views only an aesthetically pleasing, uninterrupted wooden appearance of all outer surfaces of the two-section wooden enclosure.

For purposes herein, the word "about" is to mean plus or minus fifteen percent.

Accordingly, it is a primary purpose of the present two-section wooden enclosure for a hydronic baseboard tube heater to overcome deficiencies of the prior art.

It is another purpose of the two-section wooden enclosure for a hydronic baseboard tube heater to provide for ease of removing the second section including the front panel and side panels as a single unit without having to remove the top panel and mounting brackets of the first section. This provides for a very efficient and attractive structure appropriate for ease of cleaning and servicing the finned tube heaters within the enclosure at regular use intervals to substantially enhance the heat distribution efficiency of the finned tube heaters within the present two-section wooden enclosure.

DETAILED DESCRIPTION OF THE DISCLOSURE

Figure 1:
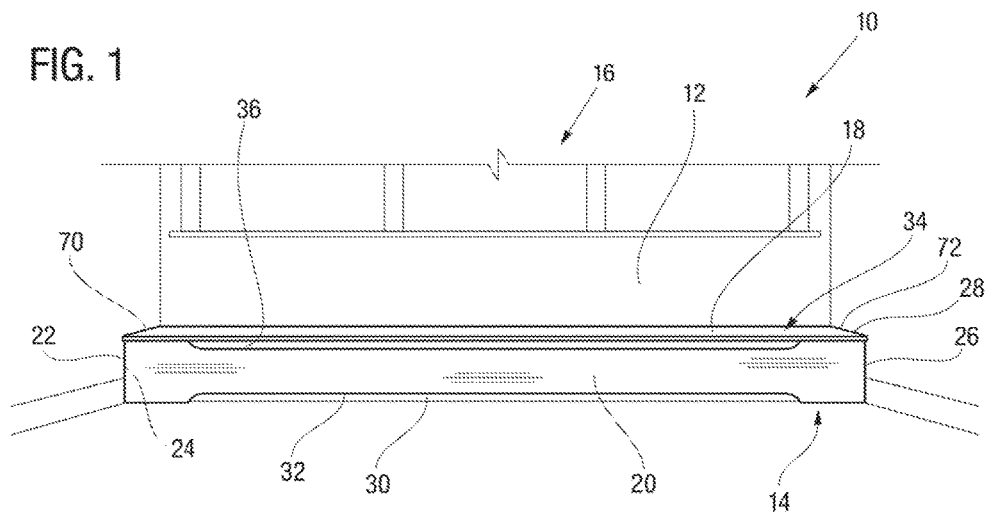
FIG. 1 is a front perspective view of a two-section wooden enclosure for a hydronic baseboard finned tube heater constructed in accordance with the present disclosure and showing the enclosure upon a floor adjacent a vertical wall.

Referring to the drawings in detail, a two-section wooden enclosure for a hydronic baseboard finned tube heater of the present disclosure is shown best in FIG. 1 and is generally designated by the reference numeral 10. FIG. 1 shows the wooden enclosure 10 adjacent a vertical wall 12 and extending along the wall 12 and an adjacent floor 14 of a building 16. Also shown clearly in FIG. 1 is a top panel 18 that is co-planar with the floor 14; a front; panel 20 that is co-planar with the vertical wall 12; a first side panel 22 adjacent a first end 24 of the front panel 20; a second side panel 26 adjacent a second end 28 of the front panel. Additionally, an air inlet, slot 30 is defined at a bottom edge 32 of the front panel 20, and an air outlet slot 34 is defined at a top edge 36 of the front panel 20.

Figure 2:
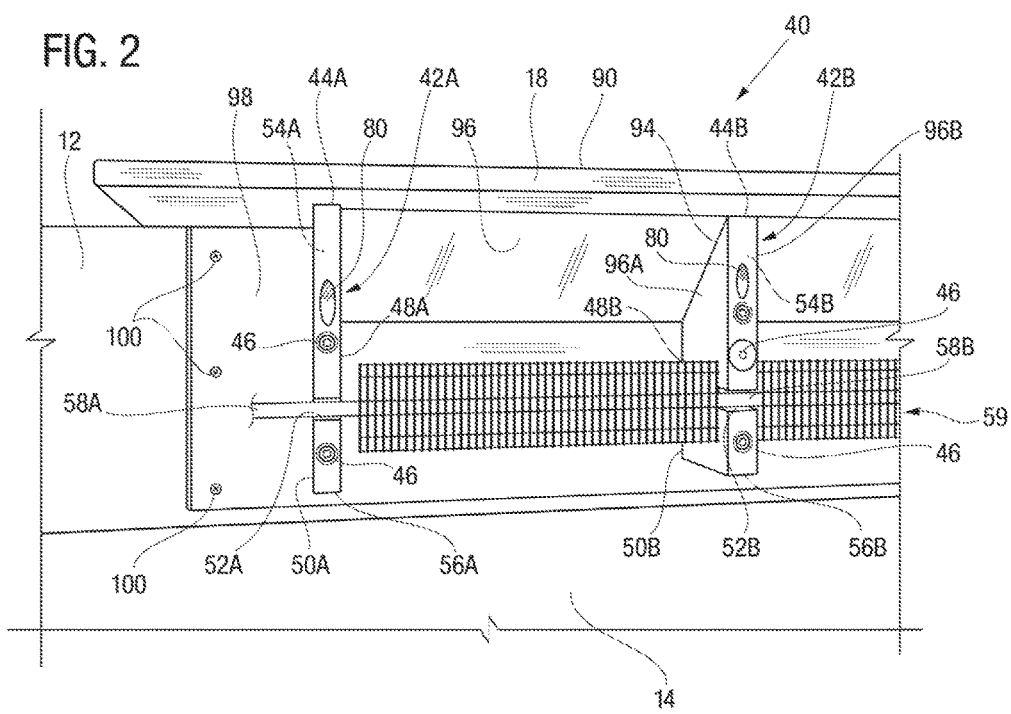
FIG. 2 is a fragmentary, perspective view of a first section of the two-section wooden enclosure of the present disclosure showing two mounting brackets secured to a vertical wall and showing a top panel secured to the mounting brackets.

A first section 40 of the two-section enclosure 10 is shown in FIG. 2 and includes the top panel 18 and a plurality of mounting brackets 42A, 42B. The top panel 18 is secured to top edges 44A, 44B of the brackets 42A, 42B. The mounting brackets 42A, 42B are secured to the vertical wall 12 at pre-selected intervals along the wall 12 by fasteners 46, such as threaded fasteners 46 or common wood screws 46. The fasteners 46 pass through at least a mid-segment 48A, 48B of back edges 50A, 50B of the mounting brackets 42A, 42B into the wall 12. Each mounting bracket 42A, 42B defines a support slot 52A, 52B extending from a front edge 54A, 54B of the bracket 42A, 42B toward back edges 50A, 50B of the bracket 42A, 42B and above bottom edges 56A, 56B of the bracket 42A, 42B. The support slots 52A, 52B are configured to receive finless sections 58A, 58B of a finned tube heater 59 through the front edges 54A, 54B of the brackets 42A, 42B. The support slots 52A, 52B support the finned tube heater 59 within the slots 52A, 52B above the bottom edges 56A, 56B of the brackets 42A, 42B.

Figure 3:
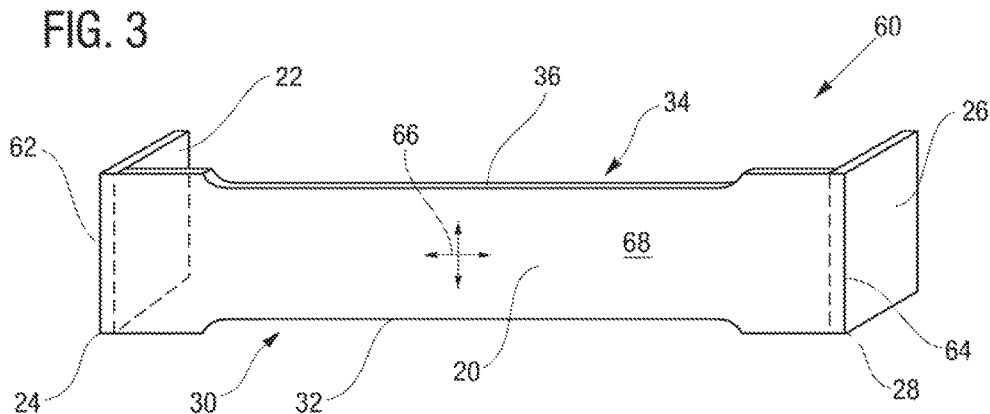
FIG. 3 is a perspective view of a second section of the two-section wooden enclosure of the present disclosure showing a front panel and first and second side panels secured to and extending away from the front panel.

As best shown in FIG. 3, a second section 60 of the two-section enclosure 10 includes the front panel 20, the first side panel 22 and a second side panel 26, the front panel 20 includes its top edge 36 and its opposed bottom edge 32. A first side edge 62 of the panel 20 extends between the bottom and top edges 32, 36 of the front panel 20 at a first end 24 of the panel. A second side edge 64 of the panel 20 extends between the bottom and top edges 32, 36 of the front panel 20 at the second end 28 of the panel 20. The first side panel 22 is secured to the first end 24 of the front panel 20 and the second side panel 26 is secured to the second end 28 of the front panel 20. The first and second side panels 22, 26 extend in parallel association with each other in a direction perpendicular to a plane 66 defined by the front panel 20, and they also extend in a direction away from a front surface 63 of the front panel 20 and toward the back edges 50A, 50B (shown in FIGS. 2 and 4) of the mounting brackets 42A, 42B.

Figure 5:
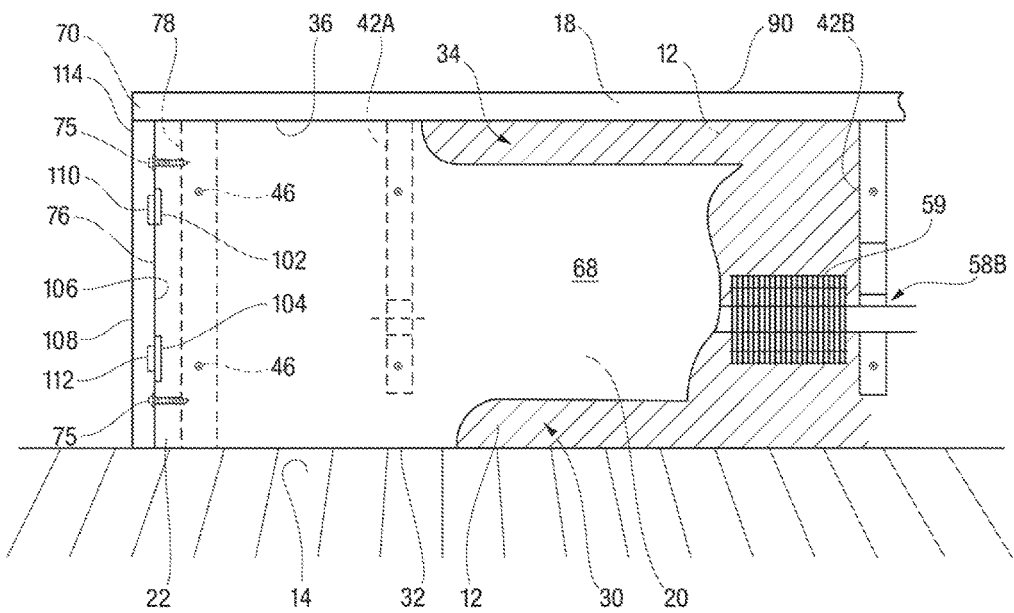
FIG. 5 is a fragmentary front plan view of the two-section wooden enclosure showing a first section secured to the vertical wall and showing a second section secured to the vertical wall adjacent the first section.
Figure 6:
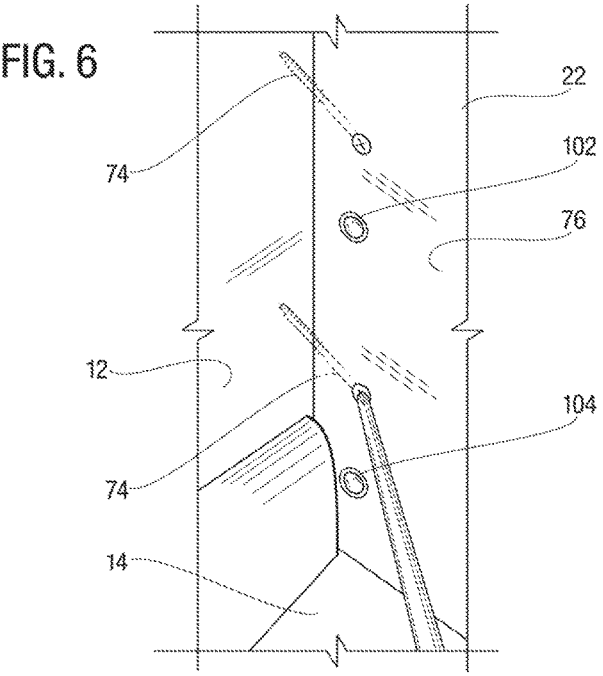
FIG. 6 is a fragmentary side perspective view of a first side panel of the second section of the two-section wooden enclosure showing an outer surface of the first side panel including a first magnet attachment mechanism, and showing a section of a fastening tool securing a fastener that passes at a non-perpendicular angle through the outer surface of the first side panel directly into the adjacent vertical wall.

As shown in FIGS. 5 and 6, the first side panel 22 is secured either directly or indirectly to the vertical wall 12 adjacent a first end 70 of the top panel 18. The second side panel 26 is shown only in FIG. 1, and is secured either directly or indirectly to the vertical wall 12 adjacent a second end 72 of the top panel 18 opposed to the first end 70 of the top panel 18. Therefore, the second section 60 of the two-section wooden enclosure 10 may be moved away from the vertical wall 12 without removal of the first section 40 of the enclosure 10 from the vertical wall 12.

Securing the first side panel 22 and/or the second side panel 26 directly into the vertical wall 12 means that, as shown best in FIG. 6 for the first side panel 22, at least one side-panel fastener 74 passes at a non-perpendicular angle through outer surfaces 76 of the first side panel 22 directly into the vertical wall 12.

Securing the first side panel 22 and/or the second side panel 26 indirectly into the vertical wall 12 (as shown in FIG. 5) means that a first end wall 78 and a second end wall (not shown) are secured into the vertical wall 12 adjacent and under the first end 70 (shown in FIG. 5) and second end 72 (not shown) of the top panel 18 and between the top panel 18 and the floor 14. To secure the first side panel 22 indirectly into the vertical wall 12 means that first side panel 22 and/or second side panel 26 (not shown in FIG. 5) are secured into the vertical wall 12 adjacent and under the first end 70 and/or second end of the top panel 72 and between the top panel 18 and the floor 14. As shown in FIG. 5 for the first end 70 of the top panel 18, at least one short side-panel fastener 75 passes at about a perpendicular angle through outer surfaces 76 of the first side panel 22 directly into the first end wall 78.

Figure 4:
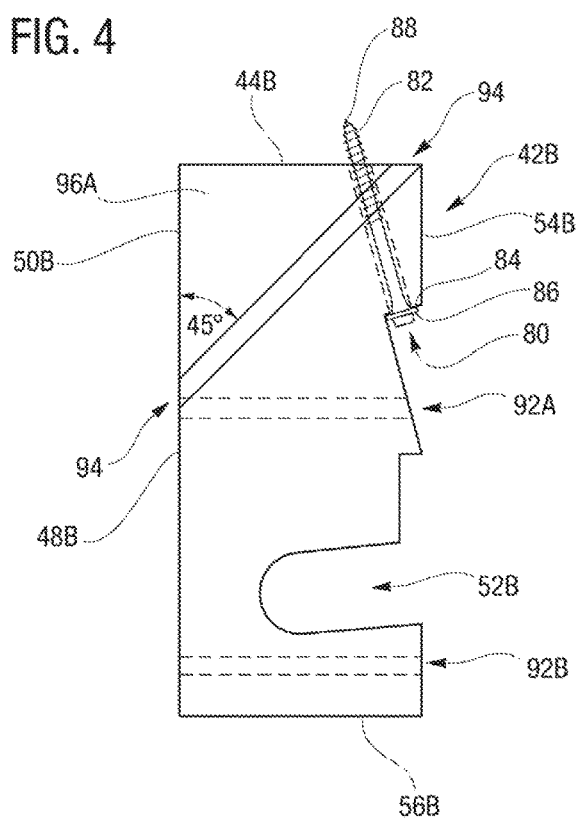
FIG. 4 is a side plan view of a mounting bracket of the present disclosure showing a support slot defined within the bracket, showing a jig-drilled, stepped screw bore passing from a front edge of the bracket through a top edge of the bracket with a top panel screw within the screw bore, and showing a baffle slot pass defined within a side of the mounting bracket and passing from adjacent a mid-segment of a back edge of the mounting bracket and through the top edge of the bracket.

In another aspect of the two-section wooden enclosure 10, and as best shown in FIG. 4, each mounting bracket 42A, 42B, such as the mounting bracket 42B shown in FIG. 4, defines a jig-drilled, stepped screw bore 80 passing from the front edge 54B of the bracket 42B through the top edge 44B of the bracket 42B. A top-panel screw 82 within the stepped screw bore 80 fastens the top panel 18 (not shown in FIG. 4) to the top edge 44B of the bracket 42B. The stepped screw bore 80 includes a step 84 defined within the bore 80 that is configured to abut a driving head 86 of the top-panel screw 82 at a location within the stepped screw bore 80 so that a leading tip 83 of the top-panel screw 82 is prevented from passing through a top surface 90 (shown in FIG. 2) of the top panel 18. FIG. 4 also shows in hatched lines fastener bores 92A, 92B for receiving the bracket fasteners 46 shown in FIGS. 2 and 5.

FIG. 4 also shows that each mounting bracket 42A, 42B, such as the bracket 42B shown in FIG. 4, may include baffle slots 94 (only one slot 94 being shown in FIGS. 2 and 4) defined within opposed side surfaces 96A, 96B of the mounting bracket 42B. The baffle slots 94 pass from adjacent the mid-segment 42B of the back edge 50B of the mounting bracket 42B and through the top edge 44B of the mounting bracket 42B. As shown in FIG. 4, an optimal angle between the baffle slot 94 alignment and the back edge 50B of the bracket 42B is about forty-five degrees. A baffle 96 (shown in FIG. 2) is secured within the baffle slots 94 so that the baffle 96 extends between the mounting brackets 42A 42B (as shown in FIG. 2) to direct heated air passing through the two-section wooden enclosure 10 away from the top panel 18 and out of the enclosure 10 through the air outlet slot 34 defined within the top edge 36 of the wooden front panel 20. Additionally, the baffle slots 94 may be dimensioned to cross over and outside of opposed sides of the jig-drilled, stepped screw bore 80, as shown schematically in FIG. 4.

FIG. 2 shows that an optional mounting backboard 93 may be secured to the vertical wall 12 and to the back edges 50A, 50B of the mounting brackets 42A, 42B. Standard fasteners 100, such as threaded screw fasteners 100, may be used to secure the mounting backboard 98 to the wall 12. The backboard 98 may be secured to the vertical wall 12 first, and then the mounting brackets 42A, 42B may be secured to the mounting backboard 98. Alternatively, the mounting brackets 42A, 42B may be first secured to the backboard 98 prior to the backboard 98 being secured to the vertical wall 12, depending upon specific characteristics of the finned tube heater 59 being enclosed.

As shown in FIG. 2 the mounting backboard 98 may be secured to the vertical wall 12 a predetermined distance above the floor 14. Similarly, the mounting brackets 42A, 42B may be secured a predetermined distance above the floor 14 of the building 16. Also, the bottom edge 32 of the wooden front panel 20 includes the air inlet slot 30 defining an opening 30 that extends a predetermined distance above the floor 14 of the building 16. As stated above in the Summary section, this aspect of the two-section enclosure 10 enhances convective flow of air within the building 16 through the finned tube heaters 59 while also facilitating cleaning access between the floor 14 and the bottom edges 5A, 56B of the mounting brackets 42A, 42B and the mounting backboard 98.

As shown in FIG. 5, the air outlet slot 34 of the two-section wooden enclosure 10 defined by the top edge 36 of the wooden front panel 20 has a planer area at least as large as a planar area of the air inlet slot 30 defined by the bottom edge 32 of the wooden front panel 20. This promotes a beneficial "chimney effect" in flow of air through the two-section enclosure 10.

As shown best in FIGS. 5 and 6, the outer surface 78 of the first side panel 22 includes at least a first magnet attachment mechanism 102 that may have a second magnet 104. An inner surface 106 of a first wooden magnetic cover plate 108 includes a second magnetic attachment mechanism 110 that may include a second magnet 112. The wooden magnetic cover plate 108 is detachable and magnetically secured to overlie the outer surface 76 of the first side panel 22. A second magnetic cover plate (not shown) may also be utilized, depending upon a location of the two-section enclosure 10. Such a second magnet cover plate (not shown) would include the same magnetic fastener structures (not shown) as with the first magnetic cover plate 108.

An outer surface 114 of the at least one magnetic cover plate 108 displays an uninterrupted wooden surface, as do outer surfaces of the first and second side panels 22, 26, top panel 18 and front panel 20. Therefore, fasteners 74, 75 securing the side panels 22, 26 directly or indirectly to the vertical wall 12 are concealed by the at least first magnetic cover plate 108 and any second magnetic cover plate (not shown). Additionally, the fasteners 46 securing the mounting brackets 42A, 42B to the vertical wall 12, and the top panel screws 82 are both concealed by the front panel 20. Therefore, all fasteners 46, 74, 75, 82 securing the first section 40 and second section 60 of the two-section wooden enclosure 10 to the vertical wall 12 are concealed from view by an observer (not shown) within the building 16. Such an observer (not shown) therefore views only an aesthetically pleasing, uninterrupted wooden appearance of all visible surfaces of the top panel 18, front panel 20, first side panel 22 and second side panel 26 of the two-section wooden enclosure 10.

In a preferred embodiment of the two-section wooden enclosure, the wood used for the enclosure 10 is from *Quercus Lobatae*, which is a group of oak trees that are often referred to as "Red Oak" (not shown) and that are known for their hardness and durability as fine furniture. Wooden components of the two-section wooden enclosure 10 would preferably be treated for both longevity and appearance according to desires of persons using the building 16.

For purposes herein, the word "about" is to mean plus or minus fifteen percent.

While the present disclosure has been presented above with respect to the described and illustrated embodiments of the two-section wooden enclosure 10 for a hydronic baseboard finned tube heater 59, it is to be understood that the disclosure is not to be limited to those alternatives and described embodiments. Accordingly, reference should be made primarily to the following claims rather than the forgoing description to determine the scope of the disclosure.

What is claimed is:

1. A two-section wooden enclosure for a hydronic baseboard finned tube heater, wherein the finned tube heater extends along a floor and adjacent a vertical wall of a building, the enclosure comprising:

a. a first section including a top panel and a plurality of mounting brackets wherein the top panel is secured to top edges of the mounting brackets, the mounting brackets are secured to the vertical wall at pre-selected intervals by fasteners passing through at least a mid-segment of a back surface of the mounting brackets into the vertical wall, each mounting bracket defining a support slot extending from a front edge of the mounting bracket toward a back edge of the mounting bracket and above a bottom edge of the mounting bracket, the support slots configured to receive a finless section of the tube heater through the front edge of the mounting bracket and support the finned tube heater within the support slot above the bottom edge of the mounting bracket;

b. a second section including a front panel, a first side panel and a second side panel, the front panel having a top edge and an opposed bottom edge, a first side edge extending between the top and bottom edges of the front panel at a first end of the panel and a second side edge extending between the top and bottom edges of the front panel at a second end of the panel, the first side panel being secured to the first end of the front panel and the second side panel being secured to the second end of the front panel, the first and second side panels extending in parallel association in a direction perpendicular to a plane defined by the front panel and away from a front surface of the front panel in a direction toward the back edges of the mounting brackets;

c. wherein the first side panel is secured in a securing indirectly to the vertical wall adjacent a first end of the top panel, and the second side panel is secured in a manner that is one of securing directly and securing indirectly to the vertical wall adjacent a second end of the top panel opposed to the first end of the top panel, so that the second section of the enclosure may be moved away from the vertical wall without removal of the first section of the two-section wooden enclosure from the vertical wall; and, wherein each mounting bracket also defines a jig-drilled, stepped screw bore passing from a front surface of the mounting bracket through a top surface of the mounting bracket so that a top-panel screw within the stepped screw bore fastens the top panel to the top edge of the mounting bracket, the stepped screw bore including a step configured to abut a driving head of the top-panel screw at a location within the stepped screw bore so that a leading tip of the top-panel screw is prevented from passing through a top surface of the top panel.

2. The two-section wooden enclosure of claim 1, wherein each mounting bracket includes baffle slots defined within opposed sides of side surfaces of the mounting bracket, wherein the baffle slots pass from adjacent the mid-segment of the back edge of the mounting bracket and through the top edge of the mounting bracket for securing baffles within the baffle slots so that the baffles extend between the mounting brackets to direct heated air passing through the two-section wooden enclosure away from the top panel and out of the enclosure through an air outlet slot surrounded by the top edge of the front panel.

3. The two-section wooden enclosure of claim 2, wherein the baffle slots cross over and outside of opposed sides of the jig-drilled, stepped screw bore, and wherein an angle between the baffle slot and the back edge of the mounting bracket is about forty-five degrees.

4. The two-section wooden enclosure of claim 1 further comprising a mounting backboard secured to the vertical wall and to the back edges of the mounting brackets.

5. The two-section wooden enclosure of claim 4, wherein the mounting backboard is secured to the vertical wall at predetermined distance above the floor of the building, wherein the mounting brackets are secured at a predetermined distance above the floor of the building, and wherein the bottom edge of the front panel defining an air inlet slot is secured a predetermined distance above the floor of the building, to enhance convective flow of air within the building through the finned tube heater and to facilitate cleaning access between the floor and the bottom edges of the mounting brackets and the mounting backboard.

6. The two-section wooden enclosure of claim 1, wherein an air outlet slot surrounded by the top edge of the front panel has a planar area at least as large as a planar area defined by an air inlet slot surrounded by the bottom edge of the front panel.

7. A two-section wooden enclosure for a hydronic baseboard finned tube heater, wherein the finned tube heater extends along a floor and adjacent a vertical wall of a building, the enclosure comprising:

a. a first section including a top panel and a plurality of mounting brackets wherein the top panel is secured to top edges of the mounting brackets, the mounting brackets are secured to the vertical wall at pre-selected intervals by fasteners passing through at least a mid-segment of back edges of the mounting brackets into the vertical wall, each mounting bracket defining a support slot extending from a front edge of the mounting bracket toward a back edge of the mounting bracket and above a bottom edge of the mounting bracket, the support slots configured to receive a finless section of the tube heater through the front edge of the mounting bracket and support the finned tube heater within the support slot above the bottom edge of the mounting bracket;

b. a second section including a front panel, a first side panel and a second side panel, the front panel having a top edge and an opposed bottom edge, a first side edge extending between the top and bottom edges of the front panel at a first end of the panel and a second side edge extending between the top and bottom edges of the front panel at a second end of the panel, the first side panel being secured to the first end of the front panel and the second side panel being secured to the, second end of the front panel, the first and second side panels extending in parallel association in a direction perpendicular to a plane defined by the front panel and away from a front surface of the front panel in a direction toward the back edges of the mounting brackets;

c. wherein the first side panel is secured, in a manner that is one of securing directly and securing indirectly to the vertical wall adjacent a first end of the top panel, and the second side panel is secured in a manner that is one of securing directly and securing indirectly to the vertical wall adjacent a second end of the top panel opposed to the first end of the top panel, so that the second section of the enclosure may be moved away from the vertical wall without removal of the first section of the two-section enclosure from the vertical wall; and, d. wherein an outer surface of the first side panel includes a first magnetic attachment mechanism, an inner surface of at least a first wooden magnetic cover plate includes a second magnetic attachment mechanism and is detachably and magnetically secured to overlie the first side panel, wherein fasteners securing the first side panel to the vertical wall are concealed by the at least first magnetic cover plate, the fasteners securing the mounting brackets to the vertical wall and a top panel screw are both concealed by the front panel, so that all fasteners securing the first and second sections of the two-section wooden enclosure to the vertical wall are concealed.

8. The two-section wooden enclosure of claim 1, wherein securing the first side panel directly onto the vertical wall includes at least one fastener passing at a non-perpendicular angle through an outer surface of the first side panel directly into the vertical wall, and wherein securing the second side panel directly into the vertical wall includes at least one fastener passing at a non-perpendicular angle through an outer surface of the second side panel directly into the vertical wall.

9. The two-section wooden enclosure of claim 1, wherein securing the first side panel indirectly onto the vertical wall includes a first end wall secured onto the vertical wall adjacent and under the first end of the top panel and between the top panel and the floor and at least one fastener passing at about a perpendicular angle through an outer surface of the first side panel directly into the first end wall, and wherein securing the second side panel indirectly onto the vertical wall includes a second end wall secured onto the vertical wall adjacent and under the second end of the top panel and between the top panel and the floor and at least one fastener passing at about a perpendicular angle through an outer surface of the second side panel directly into the second end wall.

* * * * *